United States Patent
Ikebuchi

[11] Patent Number: 5,831,717
[45] Date of Patent: Nov. 3, 1998

[54] OBSTACLE DETECTING APPARATUS WHICH EMPLOYS A LASER

[75] Inventor: Kazuhiro Ikebuchi, Himeji, Japan

[73] Assignee: Mitsubishi Denki Kabushiki Kaisha, Tokyo, Japan

[21] Appl. No.: 880,997

[22] Filed: Jun. 23, 1997

Related U.S. Application Data

[63] Continuation of Ser. No. 724,928, Oct. 2, 1996, which is a continuation of Ser. No. 339,196, Nov. 10, 1994.

[30] Foreign Application Priority Data

Dec. 14, 1993 [JP] Japan .................................... 5-313563

[51] Int. Cl.$^6$ ................ G01C 3/08; G08G 1/04
[52] U.S. Cl. .................. 356/4.01; 356/5.01; 356/5.1; 356/141.1; 340/942; 180/169
[58] Field of Search .................. 356/5.01–5.15, 356/309, 3.1, 3.11, 3.12, 3.14, 4.01, 4.1; 340/903, 942; 180/169; 350/141.1

[56] References Cited

U.S. PATENT DOCUMENTS

| | | | |
|---|---|---|---|
| 3,749,197 | 7/1973 | Deutsch | 180/169 |
| 3,781,111 | 12/1973 | Fletcher et al. | 356/5.08 |
| 4,039,782 | 8/1977 | Burckhardt et al. | 364/424.01 |
| 4,716,298 | 12/1987 | Etoh | 250/559.38 |
| 4,948,246 | 8/1990 | Shigematsu | 356/5.08 |
| 5,091,726 | 2/1992 | Shyu | 340/904 |
| 5,283,622 | 2/1994 | Ueno et al. | 356/4.01 |
| 5,314,037 | 5/1994 | Shaw et al. | 180/169 |
| 5,477,461 | 12/1995 | Waffler et al. | 364/461 |
| 5,530,651 | 6/1996 | Uemura et al. | 364/161 |
| 5,552,893 | 9/1996 | Akasu | 356/5.01 |

FOREIGN PATENT DOCUMENTS

| | | |
|---|---|---|
| 16463 | 2/1974 | Japan . |
| 106587 | 5/1988 | Japan . |
| 52953 | 3/1993 | Japan . |

*Primary Examiner*—Thomas H. Tarcza
*Assistant Examiner*—Pinemus M. Laufer
*Attorney, Agent, or Firm*—Sughrue, Mion, Zinn, Macpeak & Seas, PLLC

[57] ABSTRACT

An obstacle detecting apparatus for ensuring that the transmitted light power is sufficient to detect an obstacle at a long distance, but yet not be harmful to human eyes. The apparatus comprises a light transmitting device for transmitting a pulsed light in a plurality of angular directions, and a light receiving device for receiving the light reflected from an object. The distance to the object is based on the time difference between transmission of the light and reception of the reflected light, and the power of the transmitted light is controlled in each angular direction such that reception intensity of the reflected light in every angular direction can be within a predetermined range.

8 Claims, 8 Drawing Sheets

TIME DELAY BETWEEN TRANSMISSION AND RECEPTION CORRESPONDING TO DETECTION DISTANCE

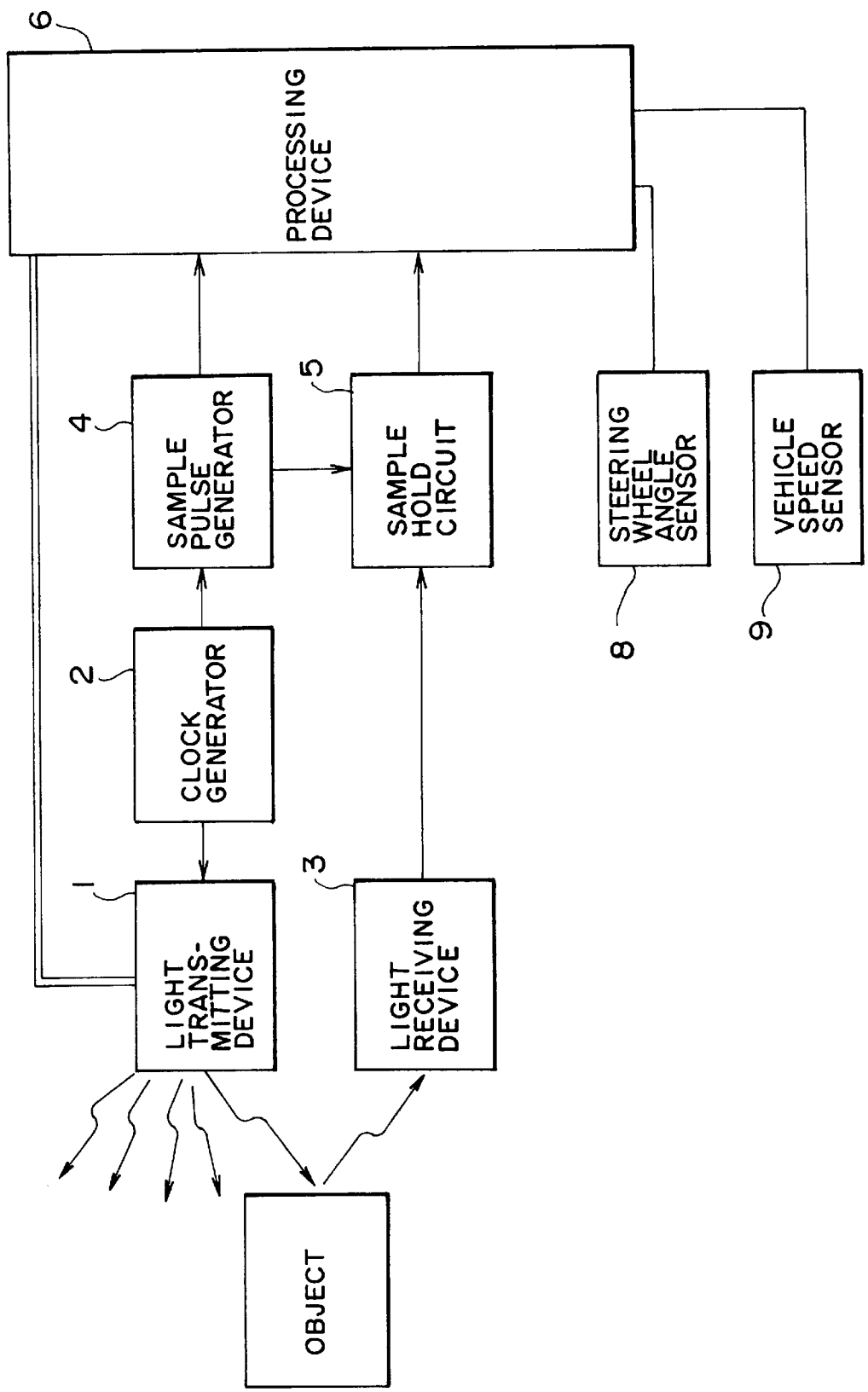

FIG. 4(a)
FIG. 4(b)
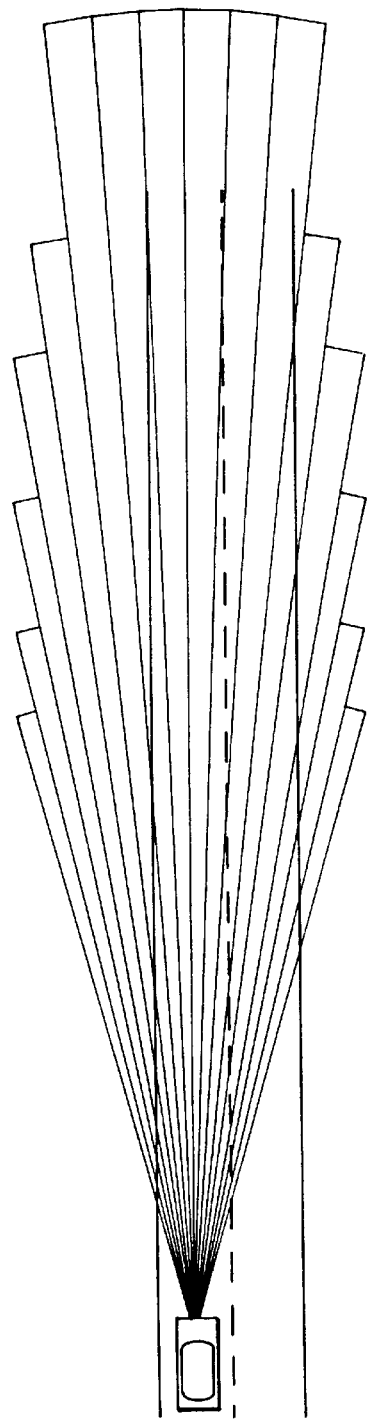
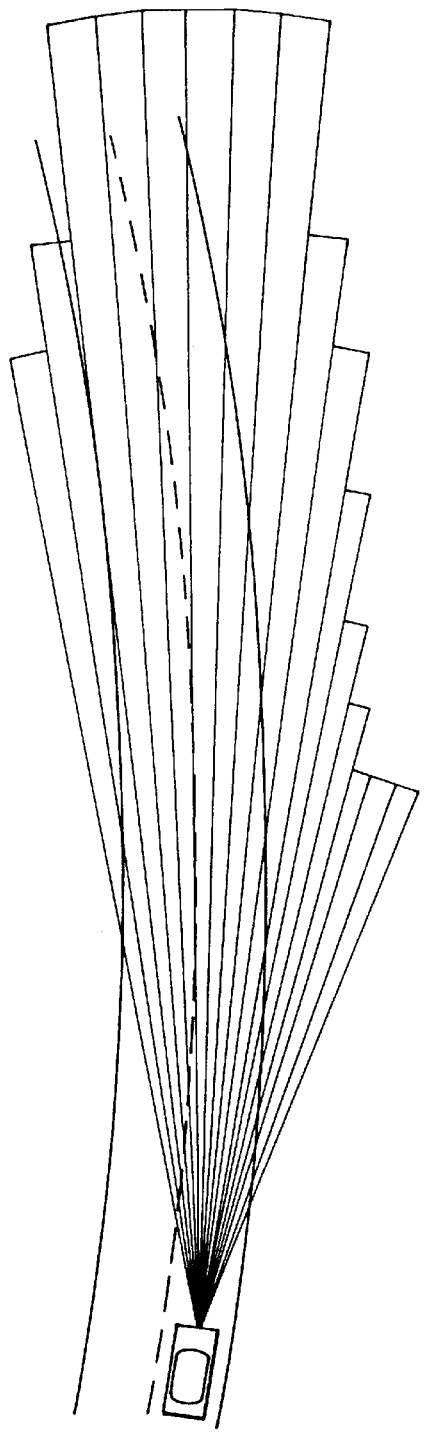

OBSTACLE DETECTING APPARATUS WHICH EMPLOYS A LASER

This is a continuation of application Ser. No. 08/724,928 filed Oct. 2, 1996 which is a continuation of application Ser. No. 08/339,196 filed Nov. 10, 1994.

BACKGROUND OF THE INVENTION

1. Field of the Invention

The present invention relates to an obstacle detecting apparatus for vehicles, and more particularly, to an obstacle detecting apparatus which employs a light laser.

2. Description of the Related Art

The above-described type of obstacle detecting apparatus is disclosed in, for example, Japanese Patent Publication No. Hei 2-228579. FIG. 8 schematically illustrates an example of such an obstacle detecting apparatus. The obstacle detecting apparatus shown in FIG. 8 includes a light transmitting device 1 for emitting pulsed light in a plurality of angular directions by driving a plurality of light-emitting elements, such as laser diodes, and a light receiving device 3 for converting, into an electrical signal, a pulsed light reflected by an object (obstacle) 7 to which the light transmitting device 1 has irradiated the pulsed light. The light transmitting device 1 is connected to a clock generator 2 for generating clock pulses which time emissions of the pulsed light. The clock generator 2 is in turn connected to a sample pulse detector 4 for counting the clock pulses and for generating sample pulses by delaying the clock pulses by a time interval corresponding to the counted value. The sample pulses are output to a sample hold circuit 5 which receives any light received by the light receiving device 3. The sample hold circuit 5 samples the output signal of the light receiving device 3 using the sample pulses. The light transmitting device 1, the sample pulse generator 4, and the sample hold circuit 5 are connected to a processing device 2 which controls the light transmitting device 1 and the sample pulse generator 4, detects an obstacle on the basis of the output signal waveform of the sample hold circuit 5 and calculates the distance to the obstacle.

The operation of the thus-arranged conventional apparatus will now be described. The clock generator 2 generates clock pulses, and the light-transmitting device 1 emits a pulsed light synchronously with the generation of the clock pulses. The pulsed light is reflected by the object 7 and the reflected light is received by the light receiving device 3. The light receiving device 3 photoelectrically converts the pulsed light into an electrical signal, and outputs the output signal to the sample hold circuit 5. The sample pulse generator 4 counts the clock pulses from the clock generator 2, and generates, for every clock pulse, a sample pulse which has been delayed from the clock pulse by a time obtained by multiplying a counted value N by a short time Δt corresponding to a distance resolution. The sample hold circuit 5 samples the signal received from the light receiving device 3 using that sample pulse, and holds that signal until a subsequent sampling. The processing device 6 compares the output signal of the sample hold circuit 5 with a threshold value L prepared for detection of the reflected pulsed light. When the level of the output signal is equal to or greater than the threshold value L, the processing device 6 determines that this reflected light is reflected from an obstacle, thereby detecting the obstacle. The processing device 6 processes the clock pulse counted value N of the sample pulse generator 4, obtained when the obstacle is detected in the manner described below to calculate a distance R to the obstacle.

$$R=N * \Delta/t * c/2 \quad \text{(Equation 1)}$$

That is, the processing device 6 obtains a distance to and from the object by multiplying the difference in time between the transmitted light and the received light, obtained from the clock pulse counted value N, by the speed of light, and then obtains the distance to the obstacle by dividing the obtained distance by two. The clock pulse counted value N returns to 0 when it becomes a value corresponding to the maximum detected distance. One cycle of operation consisting of a series of the above-described distance measuring operations is repeated for every direction of the plurality of angular directions, whereby a distance to the obstacle in the plurality of angular directions is measured continuously.

In the above-described conventional obstacle detecting apparatus, detection is enabled only when the power of the received light is equal to or greater than the threshold value L, so that transmission of high power light is necessary to detect an obstacle located a long distance away. However, the power of the transmitted light must not be higher than the value required for detection of an obstacle to prevent inadvertent danger to human eyes. Hence, Japanese Patent Laid-Open No. Sho 49-16463 discloses an apparatus designed to control the power of a transmitted light in response to vehicle speed or ambient brightness.

However, in this apparatus which controls the power of the transmitted light in response to vehicle speed, when vehicle speed is reduced, the output level of the laser beam is lowered even when there is no one within a range where the laser can affect them, thus unnecessarily limiting the obstacle detection range.

SUMMARY OF THE INVENTION

Accordingly, an object of the present invention is to provide an obstacle detecting apparatus which does not unnecessarily limit the detection range and which is safe to humans.

According to one aspect of the invention, there is provided an obstacle detecting apparatus which comprises distance detection means for transmitting a light in a plurality of angular directions to detect the presence or absence of an obstacle using a reflected light and for detecting a distance to the obstacle in the plurality of angular directions based on the time difference between transmission of the transmitted light and reception of the reflected light, and transmitted light control means for separately controlling the power of the light transmitted in each of said plurality of angular directions.

In a preferred form of the invention, the power of the transmitted light is controlled separately in every angular direction such that reception intensity of the reflected light in each angular direction can be within a predetermined range.

In another preferred embodiment, when an obstacle is detected at a short distance, the number of light transmissions toward the obstacle is reduced.

In a further preferred embodiment, the power of the light transmitted in the angular directions located to the outside of the center of direction of vehicle travel is lowered to less than the power of the light transmitted in the directions in which the vehicle is traveling.

In a further preferred embodiment, when an obstacle is detected in certain angular directions at a short distance, the power of the light transmitted in the angular directions corresponding to the area near the side portions of the obstacle is reduced.

According to another aspect of the invention, there is provided an obstacle detecting apparatus which comprises distance detection means for transmitting light in a plurality of angular directions to detect the presence or absence of an obstacle using reflected light and for detecting the distance to the obstacle in the plurality of angular directions based on the time difference between transmission of the transmitted light and reception of the reflected light, determination and inference means for determining whether the obstacle is a vehicle on the basis of the data obtained by the distance detection means and for inferring the position-and size of the vehicle, and transmitted light control means for reducing the power of the transmitted light in a predetermined range of the angular directions corresponding to the detected vehicle when it is determined that the obstacle is a vehicle.

According to a further aspect of the invention, there is provided an obstacle detecting apparatus which comprises distance detection means for detecting the presence or absence of an obstacle from light reflected from a transmitted light and for detecting a distance to the obstacle based on the time difference between transmission of the transmitted light and reception of the reflected light, and transmitted light control means for expanding the angular width of the light transmitted toward the obstacle when the obstacle is detected at a short distance or when reception intensity of the reflected light is equal to or greater than a predetermined value.

According to the obstacle detection apparatus according to the present invention, when an obstacle is a long distance away or when the reception intensity of reflected light is low, as in the case where there is fog, the power of the transmitted light is increased when necessary. In contrast, when the obstacle is a short distance away or when the reception intensity of the reflected light is high, the power density of the light transmitted in those angular directions can be reduced by reducing the power or the number of the lights transmitting in those angular directions or by expanding the illumination angle for the single transmitted light so as to assure the safety of pedestrians.

Furthermore, when an obstacle located slightly to the side of a direction in which a vehicle is travelling is to be detected, since detection at a long distance is not necessary, safety of the pedestrian who is walking at the edge of a road can be assured by limiting the power to the light transmitted sideways.

Furthermore, it is possible for a person who is present in the direction of the obstacle to avoid the danger of receiving a high power of transmitted light caused by his or her moving the face toward the angular direction.

Furthermore, when the presence of another vehicle is detected at a short distance as the obstacle, safety to the seat occupant of an adjacent vehicle can be assured by reducing the power of the light transmitted toward the vehicle.

BRIEF DESCRIPTION OF THE DRAWINGS

FIG. 3 is a block diagram of a second embodiment of the present invention;

FIGS. 4(a) and 4(b) illustrate the operation of the second embodiment;

DETAILED DESCRIPTION OF THE PREFERRED EMBODIMENTS

First Embodiment

A first embodiment of the present invention will be described below with reference to the accompanying drawings.

Figure 1:
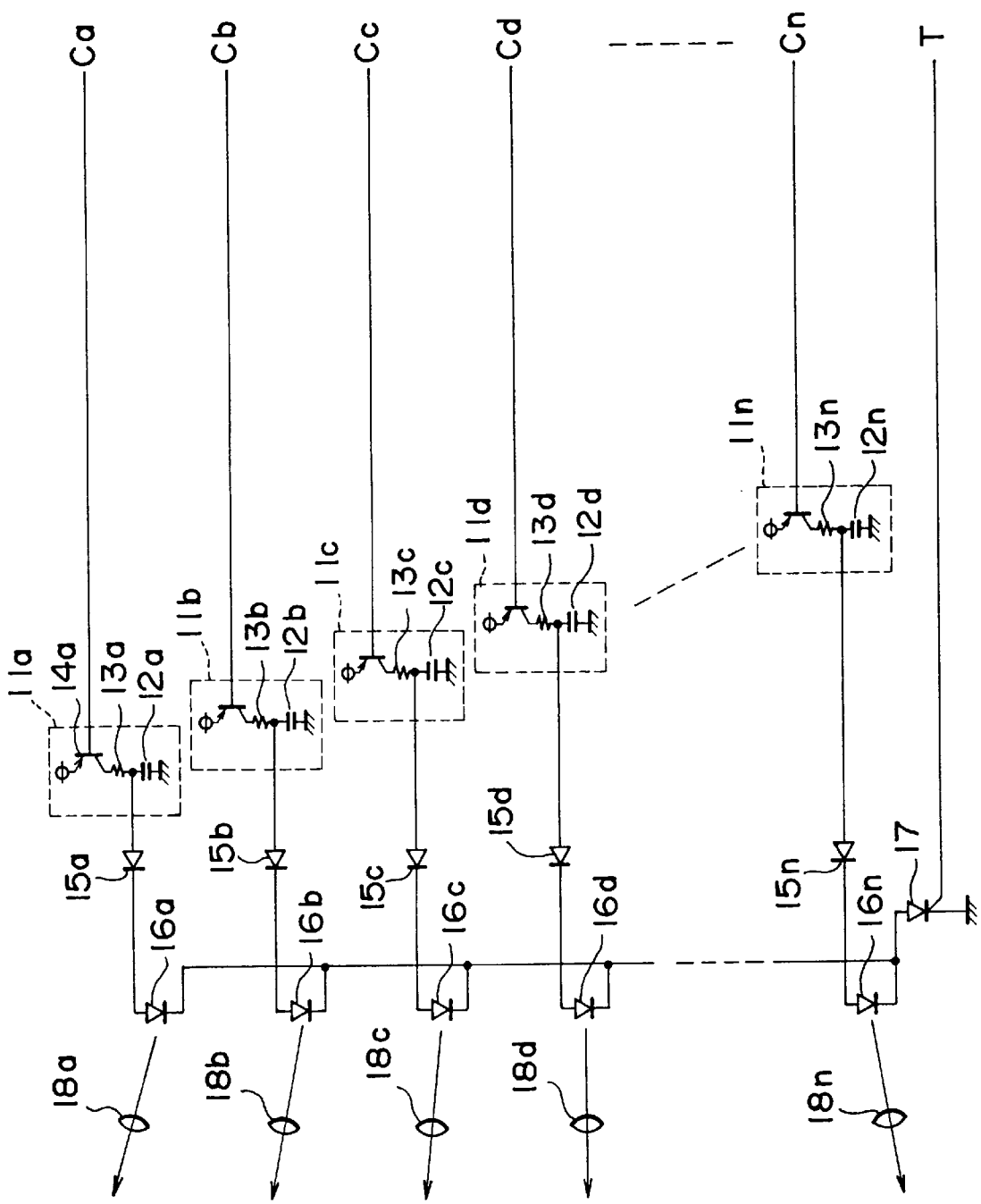
FIG. 1 is a circuit diagram of a light transmitting device.
Figure 8:
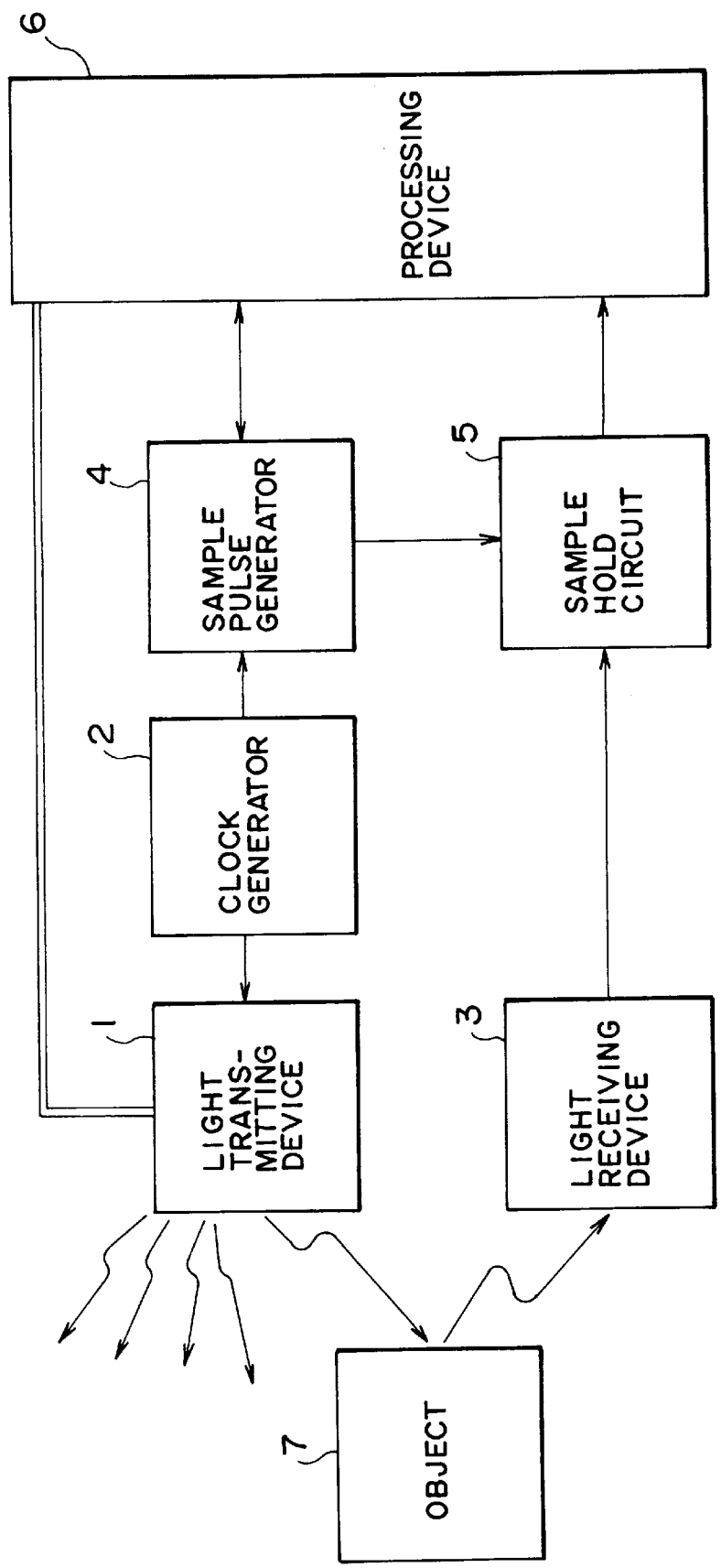
FIG. 8 is a block diagram of a conventional apparatus.

FIG. 1 is a circuit diagram illustrating an interior of the light transmitting device 1 having a structure which is almost the same as that shown in FIG. 8.

Referring to FIG. 1, the light transmitting device 1 includes laser diodes $16a$ through $16n$ serving as light-emitting elements, driving voltage control circuits $11a$ through $11n$ for controlling the voltages of the driving pulses applied to the laser diodes $16a$ through $16n$, diodes $15a$ through $15n$ for prohibiting current leakage between the driving voltage control circuits $11a$ through $11n$, and a thyrister 17 for controlling the timing of a pulse-shaped driving current supplied to the laser diodes $16a$ through $16n$. The light transmitting device 1 further includes lenses $18a$ through $18n$ located in front of the laser diodes $16a$ through $16n$ to condense the light emitted by the laser diodes $16a$ through $16n$.

The driving voltage control circuits $11a$ through $11n$ include capacitors $12a$ through $12n$ for storing energy for emission of the light to the light emitting elements $16a$ through $16n$, resistors $13a$ through $13n$ for limiting a charging current when the capacitors $12a$ through $12n$ are charged, and transistors $14a$ through $14n$ for controlling the charging timing and time for the capacitors $12a$ through $12n$.

The laser diodes $16a$ through $16n$ are provided with their light transmitting planes directed in different directions so that the light transmitting device 1 can detect obstacles over a fixed angular range centered on the central line of the vehicle.

In the thus-arranged light transmitting device 1, the charging voltages of the capacitors $12a$ through $12n$ can be controlled by controlling the energizing times of the transistors $14a$ through $14n$ using input signals Ca through Cn. Consequently, the power densities of the lights transmitted from the laser diodes $16a$ through $16n$ can be increased or decreased in every illumination angular direction. An increase or a decrease in the power density can be achieved by simply lowering the power, by increasing the light emission time intervals or by expanding the expansion angle of a single beam.

Figure 2:
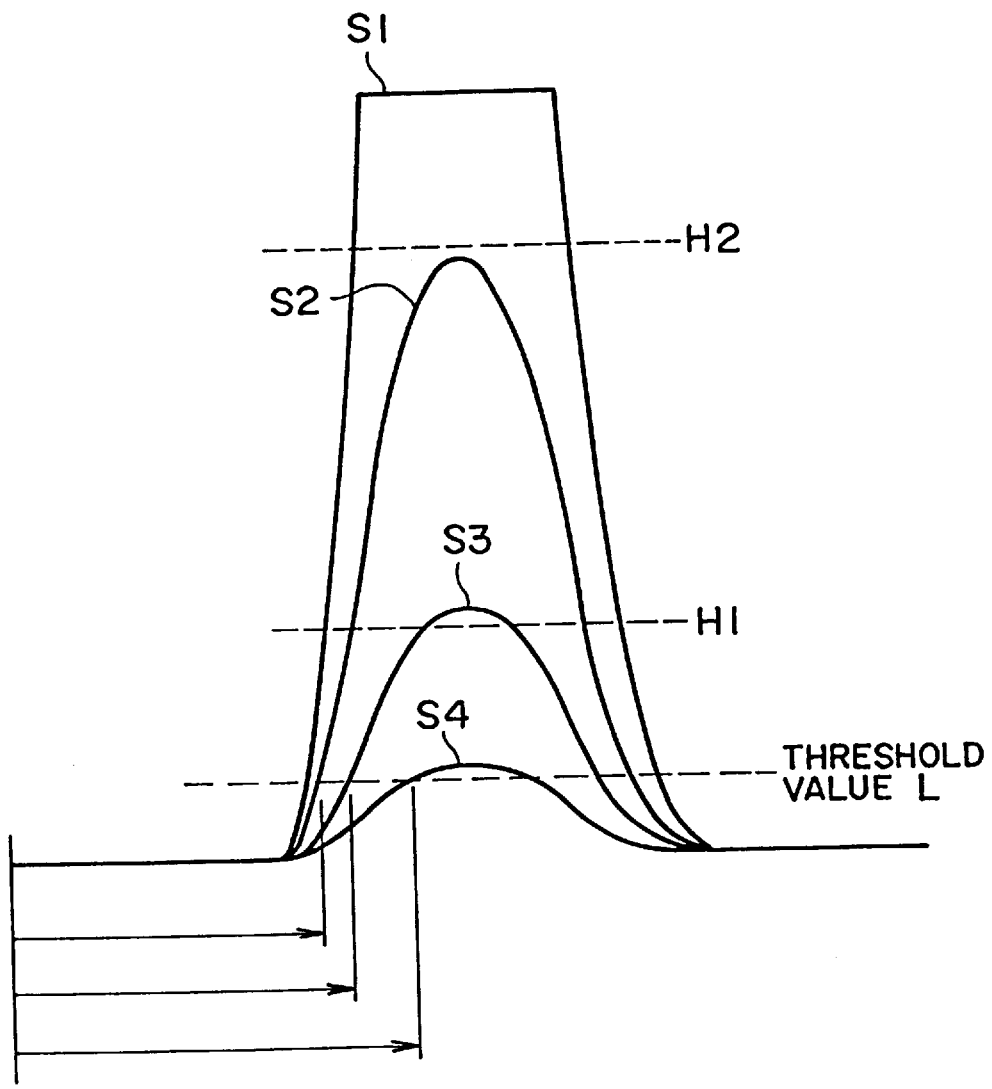
FIG. 2 illustrates the operation of a first embodiment of the present invention.

The operation of this embodiment will now be described with reference to FIG. 2. In FIG. 2, signals S1 through S4 designate the output signals of the sample hold circuit 5, i.e., the signals corresponding to the received light signals. L, H1 and H2 represent signal levels, where L is a threshold value used for detecting the distance, H1 is a lower limit of an objective related to the level of the received light signal, which is higher than L, and H2 is an upper limit of the objective related to the level of the received light signal. In this embodiment, when the level of the received light signal exceeds the upper limit H2, the intensity of the light subsequently transmitted from the same laser diode in the same direction is reduced. In contrast, when the received light signal does not exceed the lower limit H1, the intensity of the light transmitted from the same laser diode in the same direction a subsequent time is increased. Thus, in this embodiment, the power of the transmitted light is controlled such that the peak value of the received light signal waveform is within a range defined by H1 and H2. Accordingly, a light of minimum power is transmitted in every angular direction, and consequently, safety can be improved without the obstacle detecting function being degraded. Furthermore, since the intensity of the received light waveform becomes stable, variations in the time where the received light signal waveform is higher than the threshold value are reduced, thereby restricting variations in the detected value of the distance. Furthermore, when detection of an obstacle is initiated, light of a sufficiently low power is transmitted first, the power being gradually increased thereafter according to the intensity of the received light signal. Consequently, dangerous light levels which could occur when detection is started can be eliminated. Furthermore, if the lower limit H1, the upper limit H2 and the threshold value L are varied according to certain parameters, such as distance to an obstacle, control can be performed more finely. The light transmitting device 1 and the processing device 6 constitute the transmitted light control means of the present invention.

Second Embodiment

FIG. 3 schematically shows a second embodiment of the present invention. The second embodiment differs from the first embodiment in that it further includes a steering wheel angle sensor 8 for detecting the angle of a steering wheel of the vehicle, and a vehicle speed sensor 9 for detecting the vehicle speed. The reference numerals in FIG. 3 are identical to those in FIG. 8 represent similar or identical elements.

The operation of the second embodiment will be described below with reference to FIGS. 4*a* and 4*b*. FIG. 4(*a*) illustrates a case where a vehicle with the apparatus according to the present invention mounted thereon is running straight ahead. When the vehicle is running straight ahead, since the direction in which the vehicle is directed is the same as the direction of the road, the distance data in the angular directions near the central line of the vehicle represent traffic in front of the vehicle, thus requiring detection of obstacles in those angular directions for a distance range set to correspond to the vehicle speed. On the other hand, for the angular directions located to the outside of the central line of the vehicle, detection of obstacles at very short distances is sufficient, and transmission of high power light is not necessary. Rather, if light of the same power as that transmitted near the central line of the vehicle is irradiated in these angular directions, a pedestrian may be illuminated with the light from a short distance, possibly endangering him. Hence, the detection distance required for the function, i.e., the power of the transmitted light, is determined in every angular direction, as shown in FIG. 4(*a*), and when it is determined from the output signal of the steering wheel angle sensor 8 for detecting the rotational angle of a steering wheel that the vehicle is running straight ahead, the power of the light transmitted in angular directions outside of the central line of the vehicle is reduced in order to avoid illumination of pedestrians with high intensity light.

FIG. 4(*b*) illustrates a case where the vehicle on which the apparatus according to the present invention is mounted is turning to the left. When the vehicle is turning to the left, the distance data in the angular directions slightly left of the central line of the vehicle represent traffic in front of the vehicle. Thus, for these angular directions, detection of obstacles at far distances as set to correspond to the vehicle speed based on the output signal of the vehicle speed sensor 9 is necessary. In contrast, regarding the angular directions located to the right and on the outside of the central line of the vehicle, since the distance to the shoulder of a road may be very small, detection of obstacles in a distance range extending as far as the shoulder of the road, i.e., only a very short distance, is required. Thus, the transmission of high power light is not necessary in these angular directions.

As stated above, the detection distance required for each angular direction differs depending on the vehicle running conditions, such as the steering wheel angle based on the output signal of the steering wheel angle sensor 8 or the vehicle speed based on the output signal of the vehicle speed sensor 9. That is, where the speed is the same, as the steering wheel angle increases leftward, for example, the angular direction of the distance data that represents traffic in front of the vehicle shifts to the left from the central line of the vehicle. Further, as vehicle speed increases, the range of detection becomes distant.

Furthermore, under relative vehicle speed conditions, i.e., in cases where the distance to the detected obstacle remains almost the same in terms of time, e.g., in a case where it is determined that the front obstacle is another vehicle which is running in front of the vehicle, even when the direction of the front vehicle shifts from around the central line of the vehicle, the power of the light transmitted toward the front vehicle is maintained the same. In this way, even where the front vehicle has already entered a curve but the detecting vehicle is somewhere near the entrance of that curve with the steering wheel angle sensor 8 still showing a straight running state, the measurement of the distance between the vehicle and the front vehicle can be continued without losing sight of the front vehicle which has shifted from the central line of the detecting vehicle. In this embodiment, the light transmitting device 1 and the processing device 6 constitute the transmitted light control means of this invention.

Third Embodiment

Figure 5:
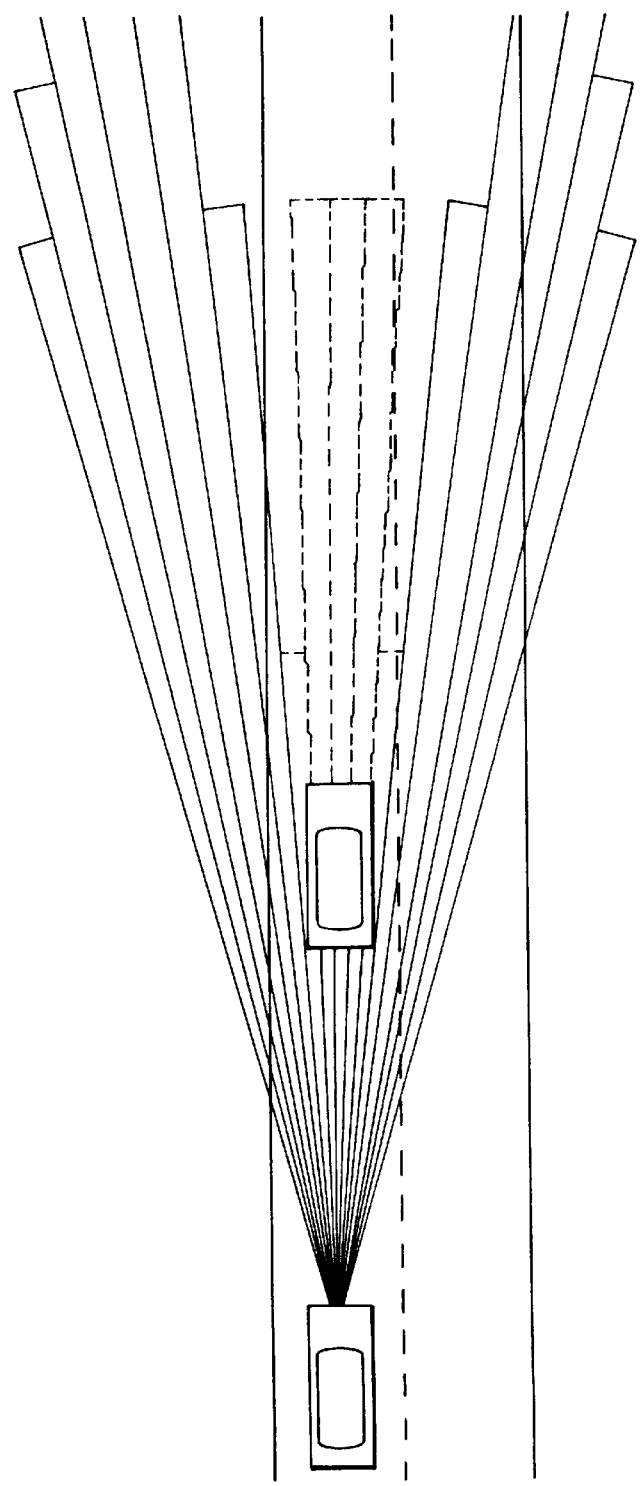
FIG. 5 illustrates the operation of a third embodiment of the present invention.

The schematic structure of the third embodiment is the same as that of the embodiment shown in FIG. 3 except for the processing contents of the processing device 6. The operation of the third embodiment will be described below with reference to FIG. 5. In the third embodiment, when distances to an obstacle in a plurality of angular directions are detected, distance data having similar distance from the vehicle or similar relative speed is extracted, and data for distances that are close to each other within a value smaller than a predetermined value (in a fixed range) are related to each other. By regarding the related data as reflectors mounted in the rear side lamps of vehicle ahead or the vehicle body portion between the rear side lamps, the obstacle ahead is recognized as a vehicle because it is determined that the plurality of detection data items are generated by a single vehicle. In the third embodiment, the power of the light transmitted in each of the angular directions is limited to a minimum value required to detect an obstacle by the same structure as that of the first embodiment. However, when the vehicle body to be detected is wet, the light reflected toward the light source weakens, and the level of the received light signal may not exceed H2 despite the short distance. Accordingly, the power of the light transmitted toward the body portion between the reflectors may not be sufficiently narrowed. This may incur a situation which is not sufficiently safe for any seat occupants of the vehicle ahead if they look back. In consideration of this problem, after the detected obstacle is determined to be a vehicle ahead, in this embodiment, the power of the light transmitted in the angular directions corresponding to the width of the vehicle ahead is reduced so that safety can be assured for any seat occupant of the front vehicle who turns back. Similarly, the power of the light transmitted in the angular directions corresponding to areas near either side of the vehicle ahead is also reduced to assure the safety of the driver of that vehicle when checking his rear view mirrors or of any seat occupant who leans out a window and looks back. In the third embodiment, the light transmission device 1 and the processing device 6 constitute the transmitted light control means of the present invention.

Fourth Embodiment

Figure 6:
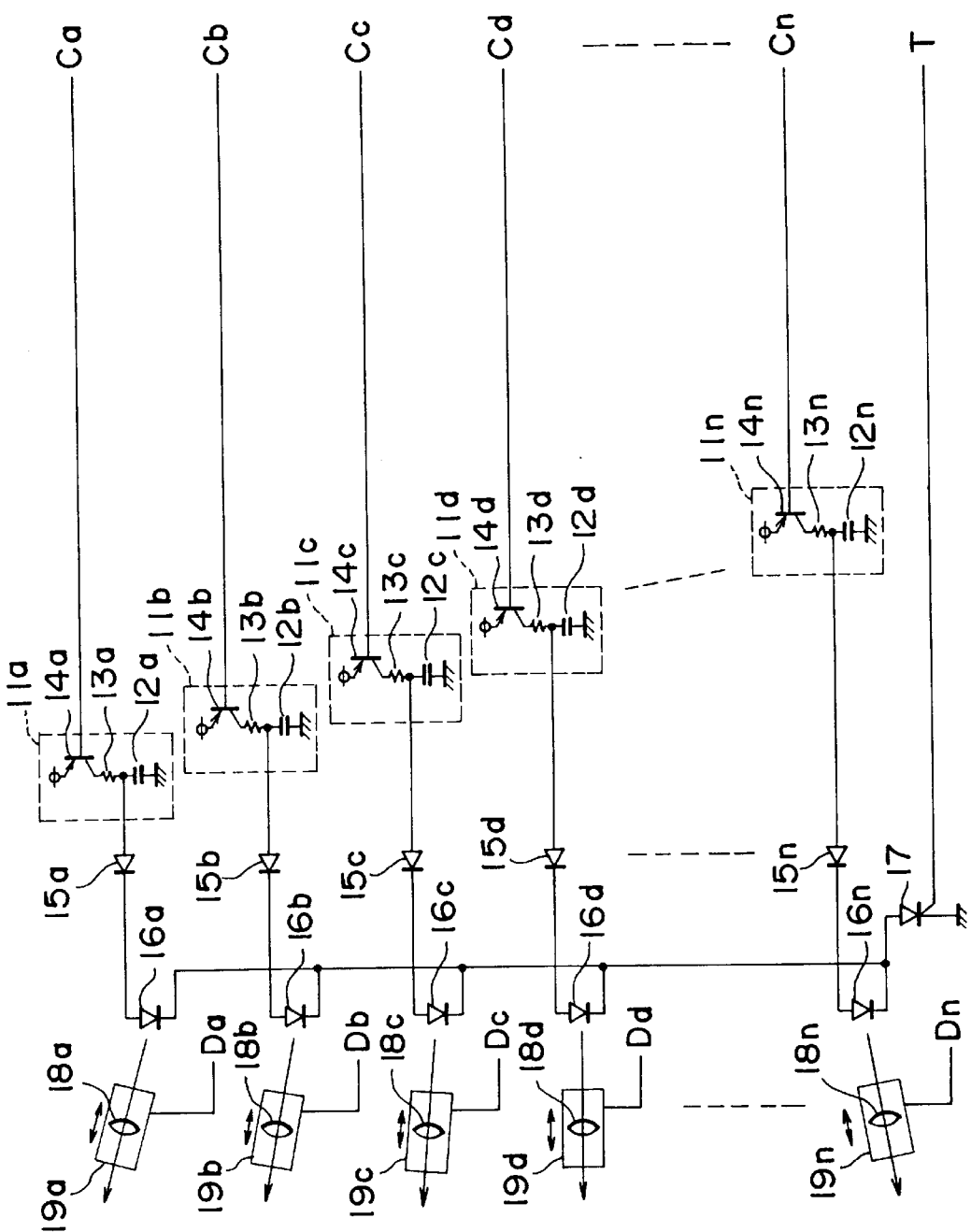
FIG. 6 is a circuit diagram of a light transmitting device of a fourth embodiment according to the present invention.

The schematic structure of the fourth embodiment is the same as that of the first embodiment except for the structure of the light transmitting device 1 and the processing of the processing device 6. FIG. 6 shows the internal structure of the light transmitting device of the fourth embodiment.

Figures 7A, 7B:
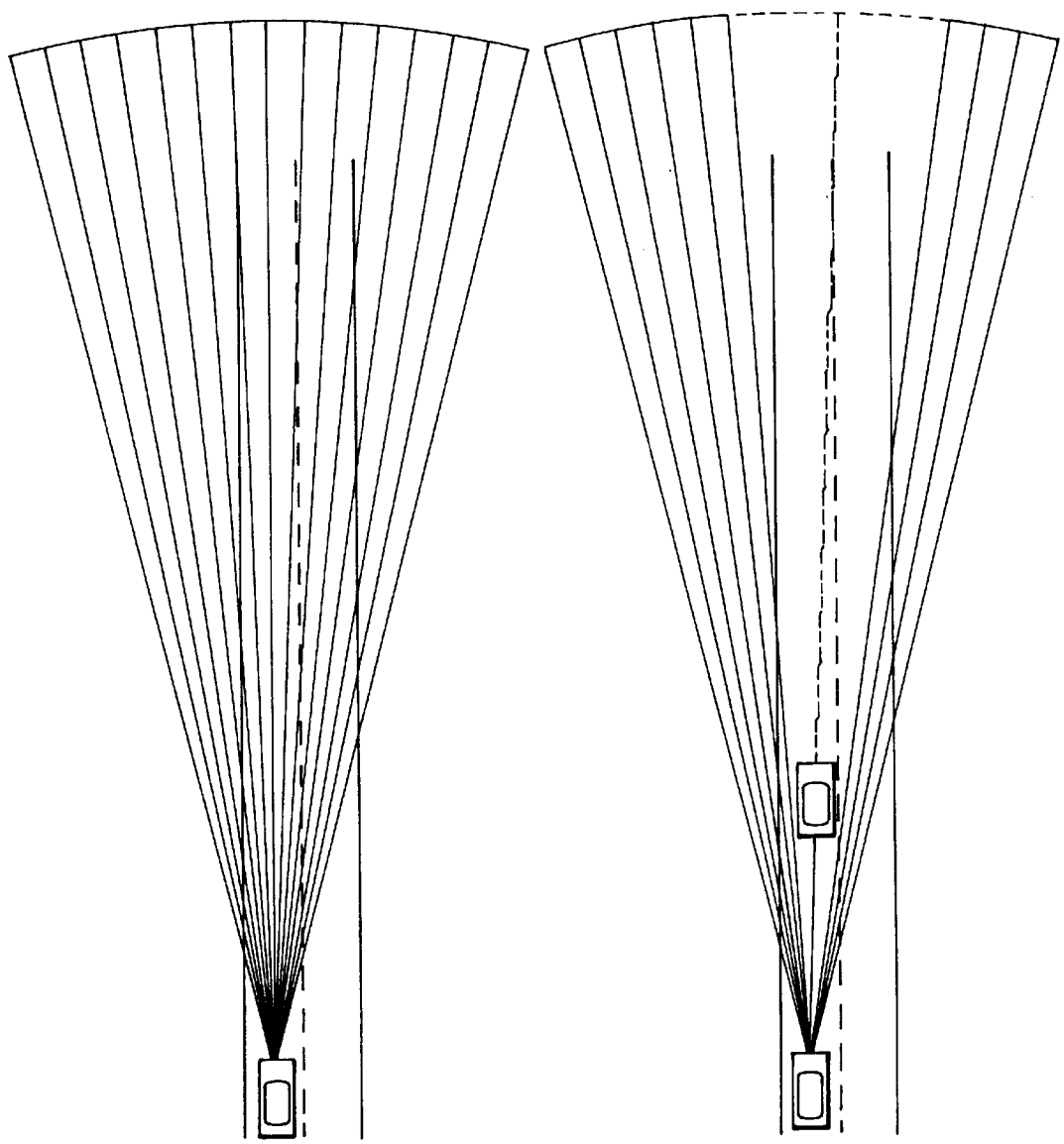
FIGS. 7(a) and 7(b) illustrate the operation of the fourth embodiment.

In the fourth embodiment, lens moving devices 19a through 19n are provided for the lenses 18a through 18n. The lens moving devices 19a through 19n are driven by the processing device 6 to adjust the distance from the laser diodes 16a through 16n to the lens 18 and thereby control expansion of the light emitted from the laser diodes 16a through 16n. In this structure, in the fourth embodiment shown in FIGS. 7(a) and 7(b), when an obstacle (vehicle ahead) is detected, as shown in FIG. 7(b), and when the distance to that obstacle is small, safety is assured by increasing expansion of the transmitted light which strikes the obstacle to thereby reduce the power density. In that case, the light transmitting device 1 and the processing device 6 constitute the transmitted light control means according to the present invention. Further, in addition to the above-described operation, for example, only the laser diodes 16a, 16c and 16e among the laser diodes 16a through 16n may be operated to reduce the number of light beams transmitted in the scanning directions towards the obstacle. In this way, illumination of a person by a plurality of transmitted light beams can be avoided, and safety can thereby be provided. In that case, the light transmitting device 1 and the processing device 6 constitute the transmitted light control means according to the present invention.

As will be understood from the foregoing description, in an apparatus for detecting a distance to an obstacle in each of a plurality of angular directions, the power, the light emission period or the expansion angle of the light transmitted in the plurality of angular directions can be controlled separately for every angular direction. Furthermore, the power of the transmitted light can be controlled separately for every angular direction so that the intensity of the received reflected light can be within a predetermined range in every angular direction. When an obstacle has been detected at a short distance, the power density or number of transmitted light beams a pedestrian may receive is reduced by expanding the angle width of the transmitted light or by reducing the number of transmitted light beams in the angular directions. The power of the light transmitted to the outside of the direction of travel of the vehicle is reduced. Alternatively, the power of the light transmitted in directions corresponding to the passenger compartment of the obstructing vehicle and immediately outside of the compartment is limited. Consequently, an obstacle detecting apparatus employing a light laser which is safe for pedestrians can be provided.

What is claimed is:

1. An obstacle detecting apparatus comprising:
   a plurality of light transmitting means, arranged in an array, for transmitting light in a plurality of angular directions;
   distance detection means for detecting the presence or absence of an obstacle using reflected light, and for detecting distance to the obstacle in said plurality of angular directions based on a time difference between transmission of the light and reception of the reflected light; and
   transmitted light control means for separately controlling intensities of the light transmitted by each of said plurality of light transmitting means such that a reception intensity of the reflected light in each angular direction is between a lower reception intensity limit which is greater than a threshold reception intensity and an upper reception intensity limit, and for controlling the intensities of the light transmitted by each of said plurality of light transmitting means such that the reception intensity of the reflected light in each angular direction is lower than a reception intensity of a previously-reflected light if the previously-reflected light has an intensity greater than the upper reception intensity limit.

2. An obstacle detecting apparatus according to claim 1, wherein said transmitted light control means lowers the power of the light transmitted in the angular directions located to the outside of a center of a direction of vehicle travel to less than the power of the light transmitted in the direction in which the vehicle is travelling.

3. An obstacle detecting apparatus according to claim 2, further comprising a vehicle speed sensor for detecting a speed of the vehicle, wherein the range of obstacle detection increases as vehicle speed increases.

4. An obstacle detecting apparatus comprising:
   distance detection means for transmitting light in a plurality of angular directions to detect the presence or absence of an obstacle using reflected light and for detecting distance to the obstacle in said plurality of angular directions based on a time difference between transmission of the light and reception of the reflected light; and
   transmitted light control means for separately controlling a power level of the light transmitted in each of said plurality of angular directions;
   wherein said transmitted light control means decreases the number of light transmissions transmitted toward the obstacle when the obstacle is detected at a short distance.

5. An obstacle detecting apparatus comprising:
   distance detection means for transmitting light in a plurality of angular directions to detect the presence or absence of an obstacle using reflected light and for detecting distance to the obstacle in said plurality of angular directions based on a time difference between transmission of the light and reception of the reflected light; and
   transmitted light control means for separately controlling a power level of the light transmitted in each of said plurality of angular directions;
   wherein said transmitted light control means reduces the power of the light transmitted in the angular directions corresponding to an area near side portions of the obstacle when the obstacle is detected at a short distance away in certain angular directions.

6. An obstacle detecting apparatus comprising:
   distance detection means for transmitting light in a plurality of angular directions to detect the presence or absence of an obstacle using reflected light and for detecting a distance to the obstacle in the plurality of angular directions based on a time difference between transmission of the light and reception of the reflected light;
   determination and inference means for determining whether the obstacle is a vehicle on the basis of the data obtained by said distance detection means and for inferring a position and size of said vehicle; and transmitted light control means for reducing power of the light transmitted only in a predetermined range of the angular directions corresponding to a width of said vehicle when it is determined that the obstacle is a vehicle.

7. An obstacle detecting apparatus comprising:

distance detection means for detecting the presence or absence of an obstacle from reflected light of transmitted light and for detecting distance to the obstacle based on a time difference between transmission of the light and reception of the reflected light; and transmitted light control means for expanding an angular width of the light transmitted toward the obstacle when reception intensity of the reflected light is equal to or greater than a predetermined value.

8. An obstacle detecting apparatus comprising:

distance detection means for transmitting light in a plurality of angular directions to detect the presence or absence of an obstacle using reflected light and for detecting distance to the obstacle in said plurality of angular directions based on a time difference between transmission of the light and reception of the reflected light; and transmitted light control means for initially transmitting the light at a low power when detection of an obstacle is initiated, and then gradually increasing power of the transmitted light based on an intensity of the received light signal.

* * * * *